(No Model.)
O. R. LUTHER.
ROLLER SKATE.
No. 252,484. Patented Jan. 17, 1882.
*fig. 1.*
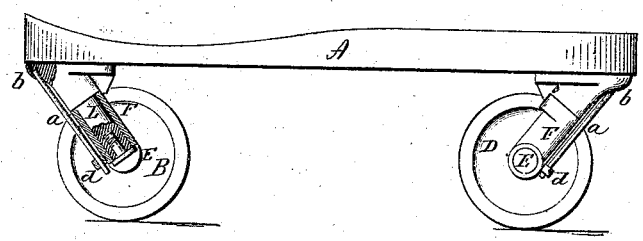
*fig. 3.*     *fig. 4.*     *fig. 5.*
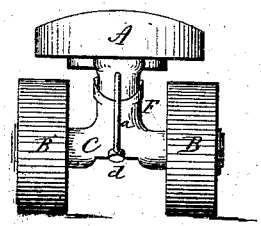 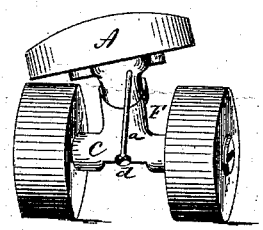 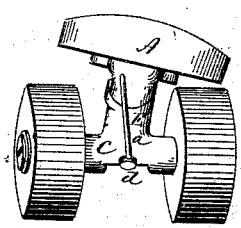
*fig. 2.*
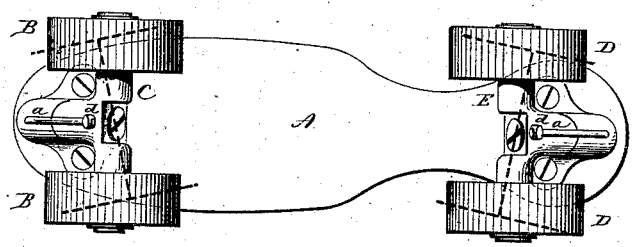
*fig. 6.*
Witnesses:
J. H. Shumway
L. D. Rogers.
Ormel R. Luther
Inventor
By Atty.

UNITED STATES PATENT OFFICE.

ORMEL R. LUTHER, OF TORRINGTON, CONNECTICUT.

ROLLER-SKATE.

SPECIFICATION forming part of Letters Patent No. 252,484, dated January 17, 1882.

Application filed September 5, 1881. (No model.)

*To all whom it may concern:*

Be it known that I, ORMEL R. LUTHER, of Torrington, in the county of Litchfield and State of Connecticut, have invented a new Improvement in Roller-Skates; and I do hereby declare the following, when taken in connection with the accompanying drawings and the letters of reference marked thereon, to be a full, clear, and exact description of the same, and which said drawings constitute part of this specification, and represent, in—

Figure 1, a sectional side view; Fig. 2, a bottom view, looking upward; Fig. 3, an end view in its position of rest or straight-forward travel; Fig. 4, a forward end view as turning to the right; Fig. 5, a forward end view as turning to the left; Fig. 6, a transverse section, showing the stops.

This invention relates to an improvement in that class of skates which are constructed for use on floors or prepared surfaces, and such as are fitted with roller-like wheels and commonly called "roller-skates."

The object of this invention is to construct the skates so that the axles will readily turn by the movement of the skater into a position at right angles to the path being traveled— that is to say, parallel with each other when going directly forward, or radial to the curve being made by the skater.

The invention consists, essentially, in arranging the axles of the wheels upon a pivot on the foot-piece in the plane of the vertical central line of the foot, but inclined to the horizontal plane of the foot at an angle of about forty-five degrees, combined with a spring between the wheels, arranged to permit the axle to be turned to the right or left, according to the curve being made, but return the axle to its normal position at right angles to the line of the foot, as more fully hereinafter described.

A represents the foot-piece, which is of substantially the usual construction; B B, the forward wheels, arranged upon an axle, C; D D, the rear wheels, arranged upon an axle, E. On the axles centrally and between the wheels a socket, F, is formed, which works on a pivot, L, attached to the foot-piece, the said pivots rigidly secured to the foot-piece and standing in the plane of the vertical central line of the foot, but inclined inward to the horizontal plane of the foot at an angle of about forty-five degrees, as seen in Fig. 1. Because of the inclination of the pivots L, if the foot-piece be tipped to one side—say the right, as in Fig. 4—the axles will be correspondingly turned, as indicated in broken lines, Fig. 2, for the reason that the pivot will be inclined corresponding to the foot-piece; but the axle in the wheels must retain its position parallel with the floor, hence will turn upon the pivot until the vertical plane of the pivot is at right angles to the axial line of the axles; and, as seen in Fig. 2, the rear wheels turn correspondingly in the opposite direction, as also seen in Fig. 2, the axial line of both axles radiating from the center of the curve, which will be readily followed by the skate. If tipped in the opposite direction, as seen in Fig. 5, then the axles will be turned in the opposite direction. The skater naturally leans inward on any curve which he is turning or attempting to turn. This inward inclination of his body correspondingly turns his foot, and in said turning the wheels assume the before-mentioned radial position to that curve. In ordinary skating the stroke of each foot is made in curves in opposite directions, that of the right foot going outward to the right, and that of the left foot outward to the left, the body and foot naturally inclining toward the curve being made. This automatic yielding or turning of the axles to accommodate themselves to those curves make it easy and natural for the skater to move, there being no more resistance, so far as the skate itself is concerned, than in making the same stroke with the common skate. As the natural or normal position of the axles should be at right angles to the central line of the foot, I arrange a metal rod, *a*, parallel with each pivot, rigidly attached by one end, as at *b*, to the shank of the pivot, the other end attached to the axle outside the pivot, as at *d*. This rod *a* is of tempered steel or other elastic material, which will yield to the turning of the axles in either direction, as indicated in Figs. 4 and 5, or, when free, will return to its normal position, as seen in Fig. 3, bringing the axles back to their parallel or normal position. The strength of the springs should be sufficient to hold them in that position, but readily yield to the natural inclination of the foot upon the foot-piece.

To prevent the axles from turning too far, or so as to set or break the spring, I provide stops *e* on the socket, which will strike against a lug, *f*, on the shank of the pivot or other part of the foot-piece when the wheels have been turned, this limit being sufficient for all practical purposes. One axle thus arranged will accomplish a very good purpose, the other being stationary, because the turning of the forward axle will tip the rear axle onto the inside wheel, or a single wheel may be used at one end and my improved arrangement at the other; but I prefer to arrange both axles in the manner described, as the same tipping of the foot will greatly reduce the radius of the curve made over what it will be with a single pivoted axle. I therefore do not wish to be understood as limiting my invention to the pivoting of both axles; but What I do claim is—

1. In a roller-skate, the axle of one or both pairs of wheels arranged upon a pivot on the foot-piece in the plane of the vertical central line of the foot-piece, but inclined to the horizontal plane of the foot at an angle of about forty-five degrees, combined with a spring-rod, *a*, parallel with the pivot, one end rigidly attached to the foot-piece, the other engaged with the axle, substantially as and for the purpose described.

2. In a roller-skate, the axle of one or both pairs of wheels arranged upon a pivot on the foot-piece in the plane of the vertical central line of the foot-piece, but inclined to the horizontal plane of the foot at an angle of about forty-five degrees, combined with a spring-rod, *a*, parallel with the pivot, one end rigidly attached to the foot-piece, the other engaged with the axle, and stops to limit the extent of turning of the axle or strain upon said spring, substantially as described.

ORMEL R. LUTHER.

Witnesses:
 LEWIS HULL,
 FRANK W. BUTLER.